United States Patent [19]

French et al.

[11] Patent Number: 4,566,271
[45] Date of Patent: Jan. 28, 1986

[54] ENGINE SYSTEMS

[75] Inventors: Geoffrey R. French, Weybridge; Pierre H. Peltret, Greenford; Brian J. Chalke, Feltham, all of England

[73] Assignee: Lucas Industries public limited company, Birmingham, England

[21] Appl. No.: 551,175

[22] Filed: Nov. 14, 1983

[30] Foreign Application Priority Data

Dec. 1, 1982 [GB] United Kingdom ................. 8234212

[51] Int. Cl.⁴ .............................................. F01N 3/02
[52] U.S. Cl. ........................................ 60/286; 60/303
[58] Field of Search ................. 60/274, 286, 303, 311

[56] References Cited

U.S. PATENT DOCUMENTS

| 3,775,064 | 11/1973 | Berger | 60/286 |
| 4,404,795 | 9/1983 | Oishi | 60/303 |
| 4,450,682 | 5/1984 | Sato | 60/303 |

Primary Examiner—Douglas Hart

[57] ABSTRACT

An engine system for a road vehicle includes an engine having an exhaust manifold which is coupled to an exhaust gas treatment device. A device is provided to deliver vaporized fuel or to burn fuel in the air inlet manifold to increase the level of noxious gas in the engine exhaust. In this case the treatment device is of the catalytic variety and the increase in the noxious gas content causes an increase in the temperature of the active mass of the treatment device resulting in self cleaning. For a non-catalytic treatment device a burner is disposed in the exhaust manifold.

1 Claim, 6 Drawing Figures

ENGINE SYSTEMS

This invention relates to engine systems for road vehicles and of the kind comprising an internal combustion engine having an exhaust manifold connected to an exhaust system of the vehicle by way of a treatment device which acts in use to purify the exhaust gases leaving the engine.

The treatment device in use, has hot exhaust gases flowing therethrough and is designed to be self cleaning providing the temperature of the exhaust gas is above a predetermined value. This temperature value in practice will only be reached during certain engine operating conditions for example, during extended periods of high speed and load. Some types of vehicle may be not be operated under such conditions for sufficient length of time to achieve the necessary self cleaning of the device with the result that the device becomes clogged with soot particles. The device therefore becomes less effective in achieving its intended purpose.

The object of the present invention is to provide an engine system in which an operating cycle is provided to effect cleaning of the device.

According to the invention an engine system of the kind specified comprises first means responsive to the pressure drop across said treatment device, second means for providing a signal indicative of the vehicle speed, third means for providing a signal representative of the speed of the engine, a control system responsive to said signals, said control system acting when the pressure drop exceeds a predetermined value and the engine and vehicle speeds are within specified ranges, to initiate operation of a device operative to cause an increase in the temperature within said cleaning device.

Examples of engine system in accordance with the invention will now be described with reference to the accompanying drawings in which.

Figure 1:
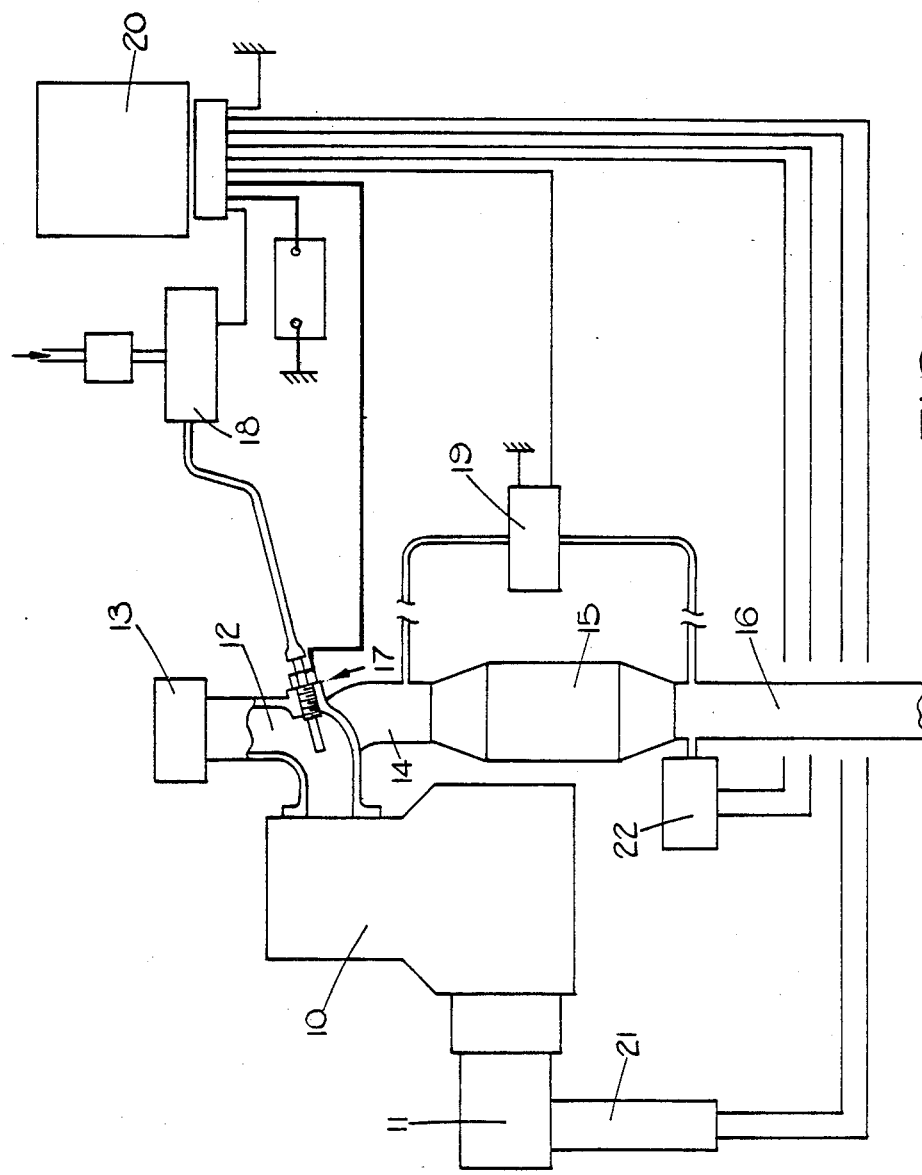
FIGS. 1, 2 and 3 show different forms of the engine system.

Referring to FIG. 1 of the drawings the engine system includes an internal combustion engine 10 of the compression ignition type which is connected to a vehicle gearbox 11 by way of clutch. The engine has an air inlet manifold 12 through which air flows to the engine through a filter 13. The engine also has an exhaust manifold 14 which is connected by way of an exhaust gas treatment device 15, to an exhaust system 16. The treatment device in this example is of the catalytic type and its purpose is to convert noxious components of the exhaust gas into less harmful components.

The conversion reaction or reactions mentioned above are exothermic so that the device is self cleaning. In general, when the engine is operating above 75% of its maximum speed, the exhaust gas has a temperature and composition such that self cleaning can take place. In some situations however the vehicle may not be operated with the engine running above 75% of its maximum speed and hence the conversion reactions mentioned above while they still take place, do not provide sufficient heat to effect the self cleaning action. In the system shown in FIG. 1, it is proposed to incorporate vaporised fuel with the air flowing to the engine. This vaporised fuel will act to increase the noxious content of the exhaust gas with the practical effect that the amount of heat generated by the conversion process will be sufficient to cause the self cleaning action described above. The additional fuel is delivered by a fuel supply device 17 to which fuel is supplied by a combined electrically operated pump and pressure regulator 18. The fuel supply device 17 incorporates an electric heating element which when heated, vaporises the fuel provided by the pump/regulator 18 and this fuel is mixed with the air flowing to the engine. Conveniently the heating element is initially energised at full power to achieve rapid attainment of the working temperature of the device, the power supplied to the device being reduced to maintain the working temperature. For this purpose the power supply to the heating element may be pulsed or it can be reduced by switching a resistor in series therewith.

In the example of FIG. 1 the need to supply fuel to the manifold is sensed by means of a pressure sensitive switch 19 and this is responsive to the pressure drop across the treatment device 15. The switch 19 closes to provide a signal to a control unit 20 when the pressure drop exceeds a predetermined value for example, 30" WG. The switch 19 is possessed of a high hysteresis so that it re-opens at a lower predetermined value for example, 10" WG to halt the supply of vaporised fuel to the manifold.

It is desirable that self cleaning or regeneration of the treatment device should only take place when the vehicle speed is above a predetermined value for example, 25 km/h and when the engine speed is between 25 and 75% of the maximum engine speed. An indication of the speed of the vehicle is provided by a transducer 21 associated with the engine gearbox and a signal representative of the engine speed is provided by a temperature sensor 22 which is responsive to the temperature downstream of the treatment device 15. The signals provided by the transducer 21 and the temperature sensor 22 are supplied to the control unit 20. In the operation of the vehicle assuming that self cleaning does not take place, the pressure drop across the treatment device 15 will gradually increase until the pressure responsive switch 19 closes. The signal provided by the switch is passed to the control unit which then decides whether the road speed is above the prescribed minimum value and whether the engine speed is within the permitted range. If conditions are correct, the heating element of the fuel supply device 17 is energised at full power as also is the motor of the fuel pump. The control unit controls the supply of power to the heating element of the fuel supply device 17 as described above. The noxious gas content of the engine is increased by the additional fuel and the conversion reactions described above take place and the carbon deposit is burned away. As the carbon deposit is removed the pressure drop across the treatment device decreases and when the pressure switch 19 opens the supply of fuel and electric power to the device 17 is halted. If the temperature sensor 22 detects a high temperature as might be caused by the engine being operated above 75% of its maximum speed, the supply of fuel and electric power to the device 17 will be halted.

Figure 2:
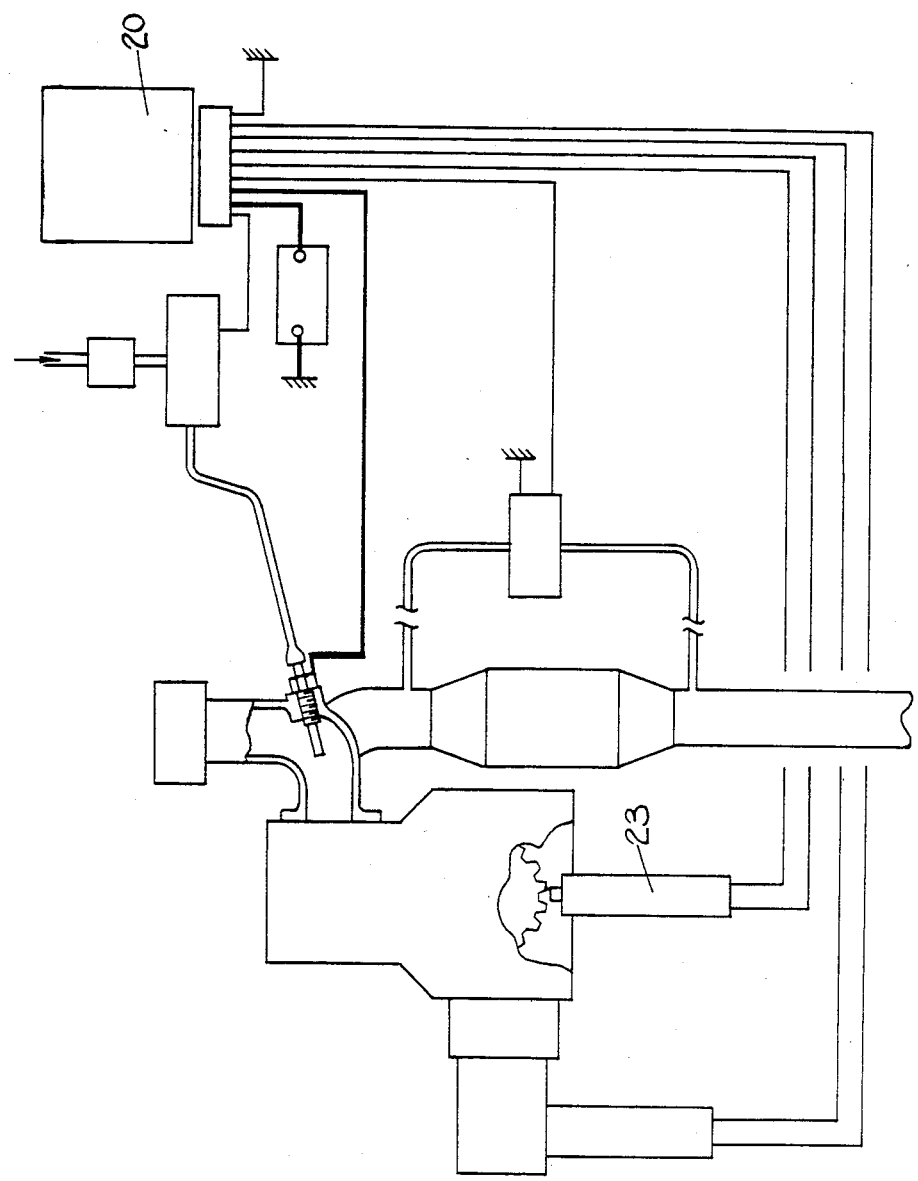

In the arrangement shown in FIG. 2 the temperature sensor 22 is omitted and a true engine speed signal is provided by a transducer 23 which senses the movement of a rotary part of the engine. The operation of the system is as described with reference to FIG. 1.

Figure 3:
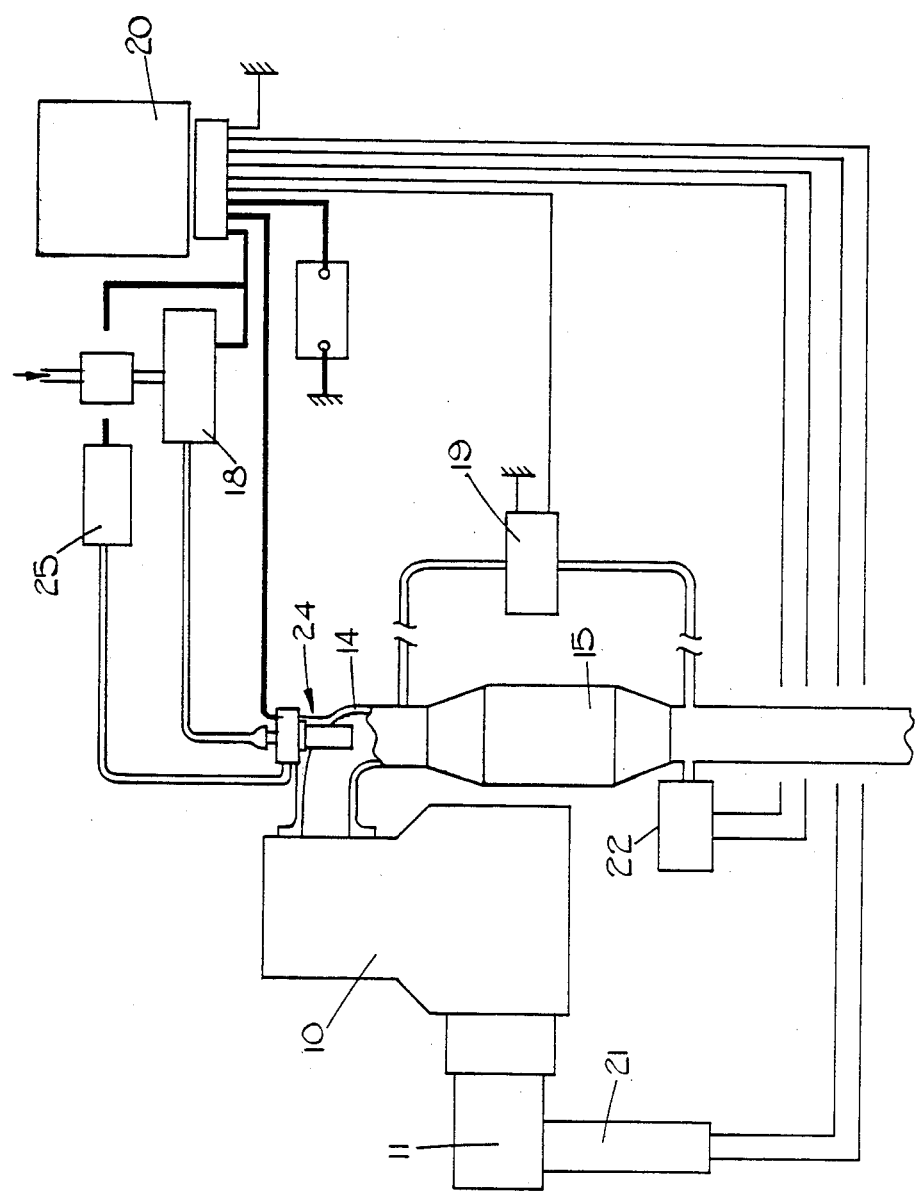

Turning now to FIG. 3, the system illustrated makes use of a fuel burner which is mounted in the exhaust manifold 14 of the engine. The burner is generally indicated at 24 and the parts of the system which are common and serve the same purpose as those of FIG. 1, are provided with the same reference numerals. Since the burner is located in the exhaust manifold, it is necessary to supply air to the burner and this is effected by means of an air pump 25. When the pressure responsive switch 19 closes to indicate a high pressure drop across the treatment device, fuel, air and electric power are supplied to the burner providing the engine speed as indicated by the temperature sensor 22 lies within the prescribed limits and providing the road speed as indicated by the transducer 21, is above the predetermined value. A flame is produced by the burner 24 which raises the temperature of the exhaust gases flowing into the treatment device to the point at which the carbon deposits therein are burnt. The treatment device of the system shown in FIG. 3 need not be of the catalytic variety although in most instances, this will be the case. If desired, the temperature sensor 22 may be replaced by the engine speed transducer 23 as shown in the system of FIG. 2.

Figure 4:
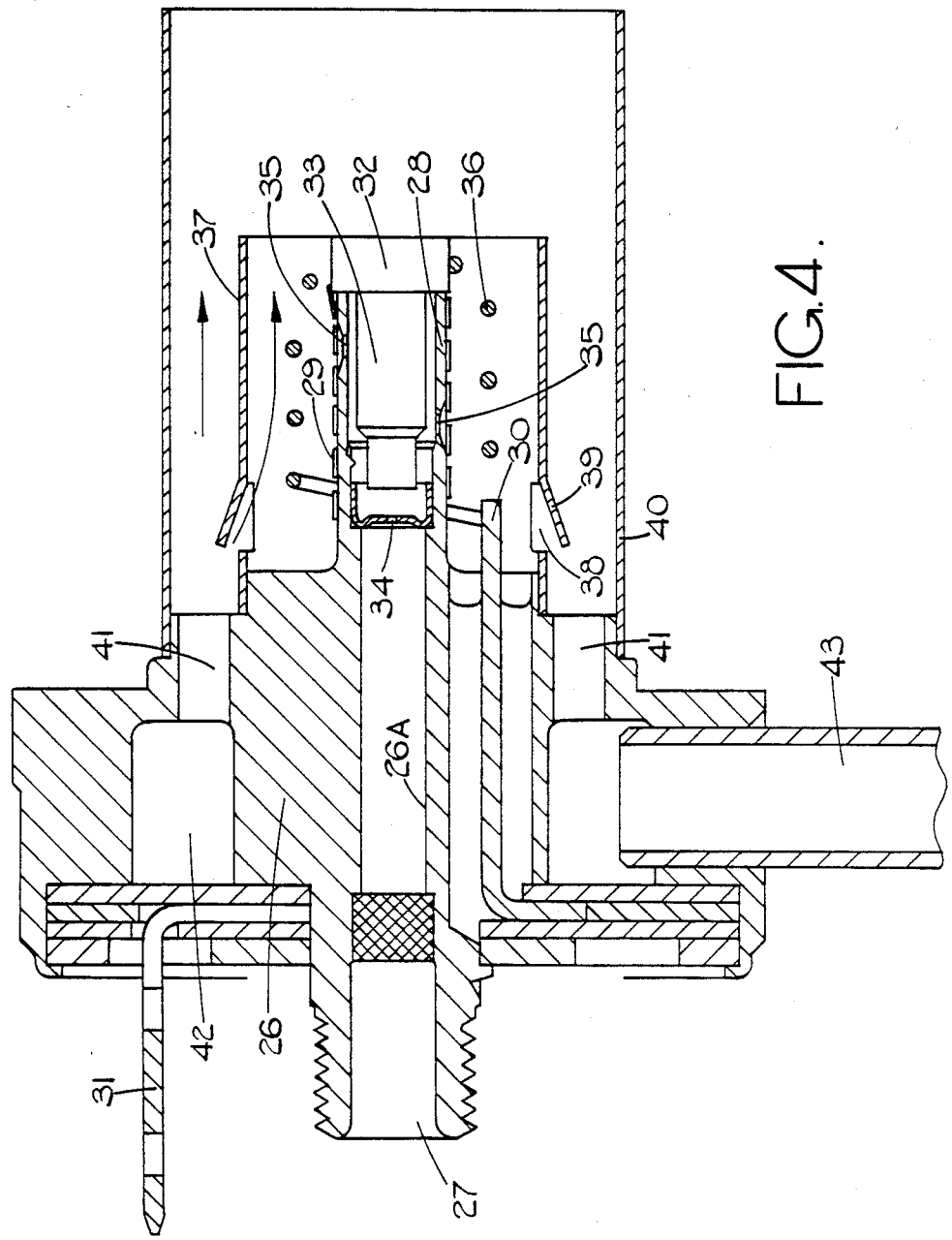
FIG. 4 shows a component of the engine system seen in FIG. 3.

FIG. 4 illustrates one example of the burner 24 and it comprises a body 26 having a central passage 26A which at one end defines a fuel inlet 27 for connection to the pump 18. The passage extends within an extension 28 of the body, the extension having a reduced wall thickness about which is wound an electric heating element 29, the element being formed from electrically conductive tape. The tape at one end is connected to an insulated terminal member 30 which is electrically connected to a connector 31 exterior of the body and the other end of the tape is connected to a plug 32 which serves to close the open end of the extension 28. Conveniently the plug carries a projection 33 which extends with clearance within the extension and defines with the wall of the extension an annular space to which fuel is supplied from the passage 26. A restricted orifice 34 is provided in an orifice plate which is mounted within the extension and this serves in conjunction with the pressure regulator, to control the rate of fuel flow. Fuel leaves the annular space by way of openings 35 formed in the wall of the extension. Surrounding the extension in spaced relationship, is an ignition element 36 one end of which is connected to the plug 32 and the other end of which is connected to the connector 30. The heating element 29 is insulated from the wall of the extension either by providing the latter with an insulating coating or by providing the material from which the element is formed with an insulating coating.

Carried by the body is a tubular member 37 which defines an annular space about the extension and in which the ignition element 36 is located. At its end adjacent the main portion of the body 25, the member 37 is provided with a series of apertures 38 associated with which are deflectors 39. Moreover, an additional tubular member 40 is provided which is also carried by the main portion of the body and the latter defines air passages 41 through which air can enter the annular space defined between the members 37 and 40. The passages 41 communicate with an annular air supply gallery 42 defined in the body, air being supplied to the gallery by way of an inlet 43 which is connected to the outlet of the air pump 25. In use, part of the air flowing through the passages 41 is deflected by the deflectors 39 into the annular space bounded by the internal peripheral surface of the member 37. This air constitutes primary air, the remaining air constituting secondary air for the burner. The flame produced by the burner is ideally a "blue" flame showing complete combustion of the fuel which is supplied to it.

Figure 5:
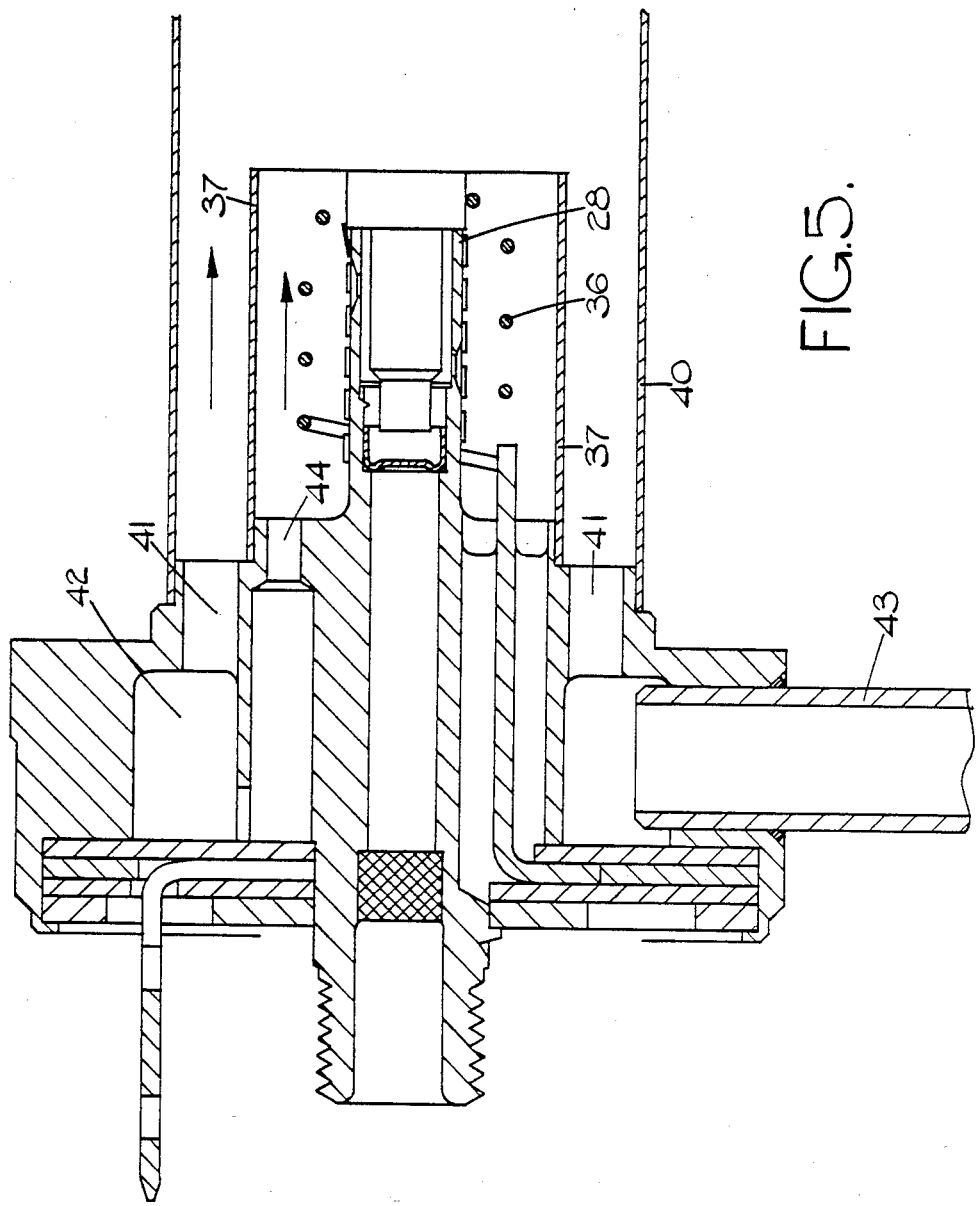
FIG. 5 shows a modification to the component of FIG. 4.

The burner which is shown in FIG. 5 is substantially identical to that of FIG. 4 with the exception that the apertures 38 in the inner tubular member 37 are omitted so that the air flowing through the passages 41 is used as secondary air only. Primary air is introduced into the space defined between the member 37 and the extension 28 by way of inlet passages 44 which communicate with the air supply gallery 42.

The fuel vaporising device 17 which is used in the system of FIG. 1, corresponds in construction, closely with the burner seen in FIG. 5. In the case of the vaporising device however the tubular member 40 is omitted as also are the air inlet passages 41 and 44 together with the ignition element 36.

Figure 6:
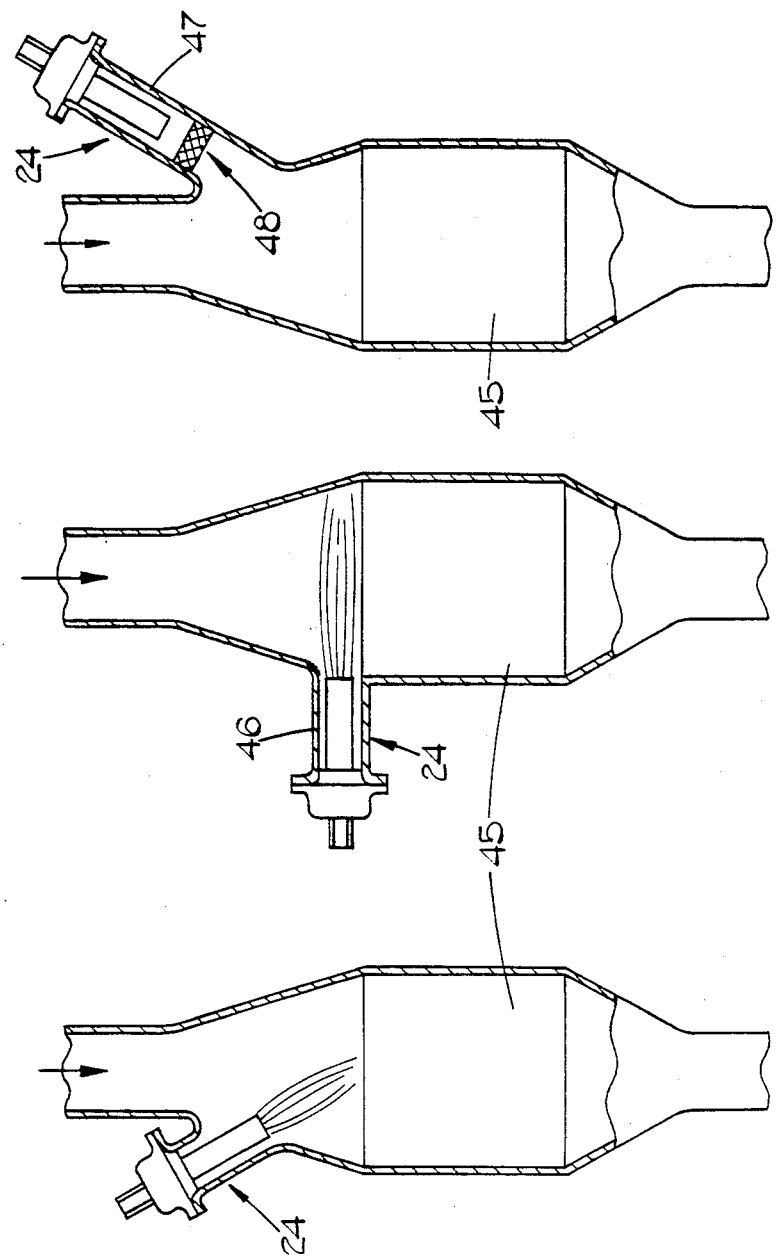
FIG. 6 shows three positions for the component shown in FIGS. 4 and 5.

In FIG. 6 there are shown three ways of mounting the burner in relation to the active mass indicated at 45, of the treatment device 15. In the example which is shown in the left hand diagram, the flame produced by the burner 24 is directed at the mass 45, the flame of the burner pointing in the downstream direction relative to the exhaust gas flow. In the central diagram the burner 24 is disposed substantially at right angles so that the flame produced by the burner extends substantially at right angles to the exhaust gas flow. Due to the exhaust gas flow however the flame will tend to be carried into the mass 45. In this example it is not necessary to provide the additional or outer tubular member 40 since the burner is located within a lateral extension 46 of the treatment device. In the arrangement shown in the right hand diagram, the burner 24 is located within a tubular extension 47 of the treatment device the axis of the extension being disposed at an angle to the exhaust gas flow. Again in this example it is not necessary to provide the additional tubular member 40. Moreover, in this example a wire mesh 48 is located in the extension 47, the mesh acting as a flame trap. The active mass 45 therefore instead of having a flame playing upon it, receives heated air from the burner.

A number of modifications are possible to the systems described. In the arrangements shown in FIGS. 1 and 2, the vaporiser 17 may be replaced by a burner such as is used in the example of FIG. 3. The action of the burner is to reduce the oxygen content of the air supplied to the engine and hence cause an increase in the noxious gas produced by the engine so that a similar effect is achieved to that of the device 17.

The use of the pressure sensitive switch 19 is an ideal way of ascertaining when the treatment device is becoming clogged with soot. In some arrangements however it may be possible to dispense with the switch and arrange that the system is brought into operation after a specific number of engine revolutions. A counter will be provided to count the number of engine revolutions and the counter would be "zeroed" when the cleaning of the treatment device has been achieved. In this arrangement it is necessary to time the operation of the treatment device and this can be done in terms of real time or in terms of the number of revolutions of the engine. Where the system incorporates a revolution counter this can be "zeroed" by a signal from the temperature sensor indicating that the vehicle is being driven with the engine speed above the 75% of its maximum speed, in other words when the treatment device is able to effect self cleaning without the addition of further fuel.

We claim:

1. An engine system for a road vehicle comprising an internal combustion engine having an exhaust manifold connected to an exhaust system of the vehicle by way of a treatment device which acts to purify the exhaust gas leaving the engine, a heating device operative to cause an increase in the temperature within said treatment device said treatment device being self cleaning when the exhaust gas temperature is above a predetermined value, the system including a control system responsive to engine speed and vehicle speed and arranged to cause operation of said heating device when the vehicle speed is above a predetermined value and the engine speed is below a predetermined value such that the engine exhaust gas temperature is below said predetermined value, and when the engine speed has been below said predetermined value for a specified period.

* * * * *